A. V. SMITH.
TAIL STOCK FOR WOOD TURNING LATHES.
APPLICATION FILED SEPT. 10, 1909.
966,253.
Patented Aug. 2, 1910.
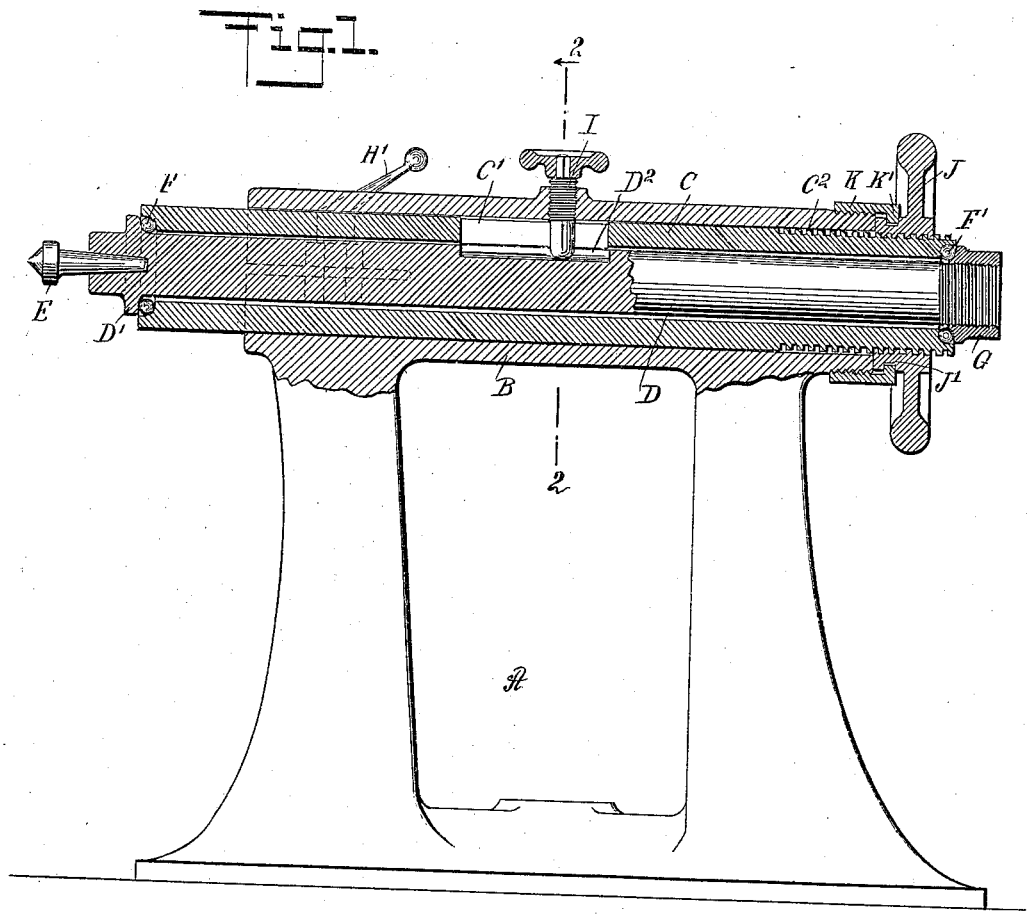
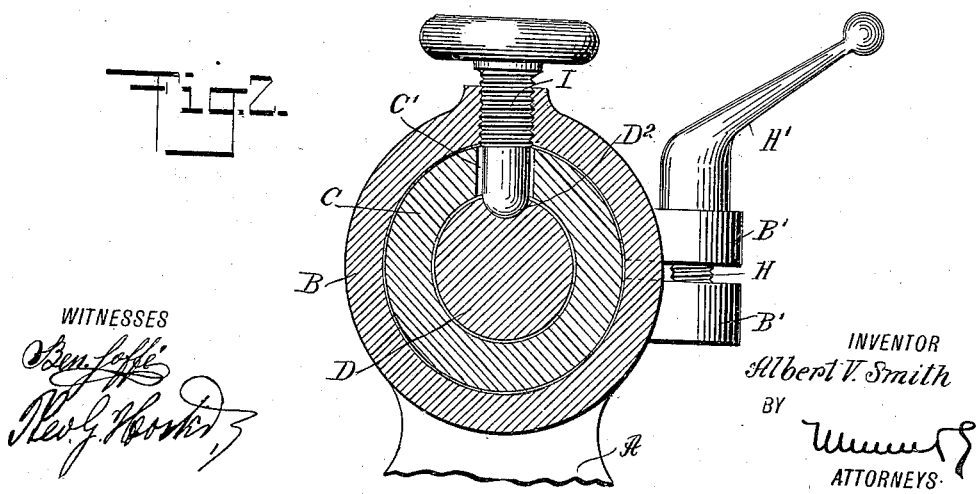

UNITED STATES PATENT OFFICE.

ALBERT VICTOR SMITH, OF PORTLAND, OREGON.

TAIL-STOCK FOR WOOD-TURNING LATHES.

966,253.  Specification of Letters Patent.  Patented Aug. 2, 1910.

Application filed September 10, 1909. Serial No. 517,017.

*To all whom it may concern:*

Be it known that I, ALBERT VICTOR SMITH, a citizen of the United States, and a resident of Portland, in the county of Multnomah and State of Oregon, have invented a new and Improved Tail-Stock for Wood-Turning Lathes, of which the following is a full, clear, and exact description.

The invention relates to lathes for turning heavy timber, and its object is to provide a new and improved tail stock, arranged to allow the tail stock spindle to turn with the timber, with a view to eliminate the friction incident to timber turning on a fixed or a dead center, and to prevent setting the timber on fire during the turning operation, the arrangement also permitting the holding of the spindle against turning when turning the small work. For the purpose mentioned, the tail stock spindle is mounted to turn in a sleeve having lengthwise adjustment in the tail stock bearing.

A practical embodiment of the invention is represented in the accompanying drawings forming a part of this specification, in which similar characters of reference indicate corresponding parts in both views.

Figure 1 is a longitudinal central section of the improved tail stock; and Fig. 2 is an enlarged transverse section of the same on the line 2—2 of Fig. 1.

The stand A of the tail stock is provided with a bearing B, in which is held lengthwise adjustable a sleeve C, and in which is mounted to turn a spindle D, provided at its forward end with a center E, of any approved construction, for engagement with the work. In the ends of the sleeve C are arranged ball bearings F, F', of which the ball bearing F engages an annular flange D', formed on the forward end of the spindle D, and the ball bearing F' engages a nut G screwing on the rear end of the spindle D, so that the latter turns with comparatively little friction in the sleeve C. The forward end of the bearing B is preferably split, as plainly indicated in dotted lines in Figs. 1 and 2, and on the said bearing B at the opposite sides of the split are formed lugs B' engaged by a clamping screw H, to clamp the spindle C firmly in position in the bearing B after the said sleeve C has been axially adjusted to the desired position in the bearing B.

In order to lock or hold the spindle D against turning, in case small work is to be turned, the following arrangement is made: In the top of the bearing B screws a set screw I, passing through a lengthwise-extending slot C' in the sleeve C, the inner end of the said set screw I engaging a lengthwise-extending groove D² formed in the spindle D and adapted to register with a slot C', as plainly shown in Figs. 1 and 2. Normally the set screw I is screwed outward out of engagement with the groove D², so that the spindle D is free to revolve in the sleeve C; but when it is desired to lock or hold the spindle D against turning, then the set screw I is turned inward at the time the groove D² is in register with the slot C', so that the inner end of the set screw I engages the groove D² and holds the spindle D from turning.

The rear end of the sleeve C is provided with a thread C², on which screws a wheel nut J, provided on its hub with an exterior annular groove J', engaged by an inwardly-extending flange K' formed on a cap K, screwed or otherwise secured to the rear end of the bearing B. By the arrangement described the wheel nut J can be readily turned by the operator, to move the sleeve C and with it the spindle D and the center E in an axial direction, toward or from the head stock of the lathe, to bring the center E into the desired position relatively to the work turned at the time. It is understood that when the wheel nut J is turned in one direction, the sleeve C, spindle D², and center E are moved toward the head stock of the lathe, and when the wheel nut J is turned in the opposite direction the said parts are moved from the said head stock.

The tail stock shown and described is very simple and durable in construction and can be readily applied to wood-turning lathes as now constructed.

It will be seen that by the arrangement described, the center E turns with the work in case the latter is a heavy timber, and when light work is to be turned, the center E can be held against rotation the same as an ordinary wood-turning lathe.

Having thus described my invention, I claim as new and desire to secure by Letters Patent:

1. A tail stock having a stand provided with a bearing, a sleeve held in the said bearing and provided with a lengthwise extending slot, a spindle mounted to turn in the said sleeve and provided with a center and with a lengthwise-extending groove adapted to register with the said slot, and a set screw screwing in the said bearing and passing through the said sleeve slot into the said spindle groove.

2. A tail stock having a stand provided with a bearing, a sleeve held in the said bearing and provided with a lengthwise-extending slot, the said sleeve having an exterior screw thread, a spindle mounted to turn in the said sleeve and provided with a center and with a lengthwise-extending groove adapted to register with the said slot, and a set screw screwing in the said bearing and passing through the said sleeve slot into the said spindle groove.

3. A tail stock having a stand provided with a bearing, a sleeve held in the said bearing and provided with a lengthwise-extending slot, a spindle mounted to turn in the said sleeve and provided with a center and with a lengthwise-extending groove adapted to register with the said slot, a set screw screwing in the said bearing and passing through the said sleeve slot into the said spindle groove, a wheel nut screwing on the said screw thread and having its hub provided with an annular groove, and a cap held on the said bearing and having a flange engaging the said wheel hub groove.

4. A tail stock having a stand provided with a bearing, said bearing being split at its inner end and having a lug on each side of the split, a set screw engaging the lugs for the purpose specified, a sleeve in the bearing, a spindle in the sleeve, and means movable into and out of engagement with the sleeve and spindle to prevent or permit of rotary movement of said sleeve and spindle while permitting longitudinal movement thereof.

5. A tail stock having a stand provided with a bearing, a sleeve held in the bearing, a spindle journaled in the sleeve and provided with a center, the sleeve having at its outer end a threaded portion, a wheel nut on the threaded portion, and having its hub provided with an annular groove, and a cap held on the bearing and having a flange engaging the groove.

In testimony whereof I have signed my name to this specification in the presence of two subscribing witnesses.

ALBERT VICTOR SMITH.

Witnesses:
W. S. GREGORY,
P. G. McINIS.